US006286696B1

(12) United States Patent
Van Gorp et al.

(10) Patent No.: US 6,286,696 B1
(45) Date of Patent: Sep. 11, 2001

(54) HOIST SYSTEM ANTI-DRIFT DEVICE

(75) Inventors: Eric Brian Van Gorp, Schererville, IN (US); Myron Glickman, Arlington Heights, IL (US); Daniel Brian Zakula, Sr., Mokena, IL (US); James Baty, Alsip, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 09/479,171

(22) Filed: Jan. 7, 2000

(51) Int. Cl.$^{7}$ ........................ B60P 3/00
(52) U.S. Cl. ........................ 212/343; 212/344
(58) Field of Search ........................ 414/460; 212/343, 212/344, 345; 254/323

(56) References Cited

U.S. PATENT DOCUMENTS

| | | | | |
|---|---|---|---|---|
| 700,162 | | 5/1902 | Wiley . | |
| 812,689 | * | 2/1906 | Sinclair | 212/343 |
| 2,193,047 | * | 3/1940 | Truitt et al. | 212/343 |
| 2,427,667 | * | 9/1947 | Gilbert | 414/460 |
| 2,472,197 | * | 6/1949 | Dowd | 414/460 |
| 2,478,094 | | 8/1949 | Gelbman | 212/31 |
| 3,076,559 | | 2/1963 | Crile | 212/56 |
| 3,129,821 | | 4/1964 | Graham et al. | 212/55 |
| 3,738,614 | * | 6/1973 | Peterson | 254/187 |
| 3,845,935 | * | 11/1974 | Chambers | 254/110 |
| 3,858,847 | * | 1/1975 | Chambers | 254/108 |
| 4,597,497 | * | 7/1986 | Aberegg | 212/147 |
| 4,599,030 | * | 7/1986 | Skaalen et al. | 414/460 |
| 5,221,075 | | 6/1993 | Habicht | 254/387 |
| 5,319,292 | * | 6/1994 | Backstrand | 318/371 |
| 5,529,452 | * | 6/1996 | Boyles et al. | 414/460 |

FOREIGN PATENT DOCUMENTS

| | | | | |
|---|---|---|---|---|
| 3830102A | | 4/1989 | (DE) | B66C/23/66 |
| 15013 | * | 10/1911 | (GB) | 212/343 |
| 432086 | | 7/1975 | (SU) | B66C/23/02 |
| 854867 | | 8/1981 | (SU) | B66C/23/02 |

* cited by examiner

*Primary Examiner*—Thomas J. Brahan
(74) *Attorney, Agent, or Firm*—Leydig, Voit & Mayer, Ltd.

(57) ABSTRACT

A gantry crane including a lifting grappler is provided with a hoist locking mechanism to prevent undesired downward drifting of the grappler, especially during periods when the crane is parked and not in operation. The hoist locking device can selectively secure the grappler in a raised position, maintaining a maximum clearance under the raised grappler. The crane includes a hoist line, such as a chain or cable, that suspendably supports the weight of the grappler, and a hoist actuator for moving the hoist line, thereby lifting or lowering the grappler. In an embodiment, the hoist locking device is selectively operable to secure the hoist line in a predetermined position, preventing the grappler from lowering. For example, an embodiment of the hoist locking device includes a hook-shaped latch member movably mounted to the frame for engagement with a catch member fixed relative to the hoist line. The catch member may, for example, be a projection from a clevis mounted to the hoist actuator. A latching actuator is provided for driving the hook between engaged and disengaged positions.

12 Claims, 5 Drawing Sheets

HOIST SYSTEM ANTI-DRIFT DEVICE

BACKGROUND OF THE INVENTION

The present invention generally relates to the art of gantry cranes and more particularly to a gantry crane having a hydraulically actuated hoist system.

Gantry cranes are conventionally used in railyards, shipping yards, and other places for loading and unloading containers and loads to and from railcars, trailers, pallets, etc. Such a crane typically has a rigid steel frame that holds a grappler in an elevated manner. More particularly, the frame defines a wide central opening to span across or straddle a truck or railcar while suspending the movable grappler overhead. Typically, the frame includes a plurality of vertical beams mounted to a plurality of horizontal overhead beams. Such cranes are mobile, having a plurality of wheels on which the crane can be driven around a loading yard.

To movably support a grappler, a common crane design includes a pair of movable horizontal stabilizer beams. Each of these stabilizer beams extends between two of the vertical beams of the frame, the stabilizer beams being mounted for vertically slidable movement. The grappler is mounted to the stabilizer beam for lifting containers or other loads.

The crane includes a hoist system for vertically moving the stabilizer. In particular, the hoist system includes a hoist actuator operable to drive chains, cables or other hoist lines for vertically moving the stabilizer beams and the grappler. Through controlling the hoist actuator, the grappler can be raised or lowered to engage container. For example, the hoist actuator may be linear actuator such as a cylinder or a ball screw mechanism, which may be hydraulic, pneumatic, electric, etc.

Unfortunately, hoist actuators have been known to "drift" or slowly move under the load of the grappler over a period of time when the crane is parked. For example, in an embodiment wherein the hoist actuator is a hydraulic cylinder or motor, some degree of internal or external leakage can occur, particularly after seals become worn during service. If the hydraulic cylinder "drifts" due to internal leakage, the grappler slowly lowers toward the ground. The drifting movement is usually so slow as to be imperceptible over a short period to a human observer. This drifting can, however, be problematic.

In particular, the drifting of a grappler is dangerous if the crane has been parked to straddle a live railroad track or road. Cranes are often parked in this manner in a loading yard due to convenience or lack of space. Although an operator may have initially parked the crane with the grappler at a raised position to clear the travel path below, the hoist system may drift over time, causing the grappler to lower. An accident can occur if the grappler undesirably lowers into the pathway of a train or truck passing through the frame of the crane.

Accordingly, a need exists for a means to prevent drifting of the hoist system. More particularly, a need exists for locking the grappler in a raised position indefinitely.

SUMMARY OF THE INVENTION

The present invention overcomes problems in the prior art by providing a hoist locking device which can selectively secure the grappler in a raised position. For example, in an embodiment, the invention provides a gantry crane having frame and a hoist system. The hoist system includes a hoist actuator mounted to the frame, a hoist line (e.g., a cable, chain or other line) operably connected to the actuator for extending and retracting movement therewith, a grappler supported by the hoist line, and a hoist locking device. The hoist locking device is operable to selectively secure the hoist line in a predetermined position and thereby prevent downward movement of said grappler.

More particularly, in an embodiment, the hoist locking device includes a latch member movably mounted to the frame and a catch member fixed relative to the hoist line. The latch member is movable between a first position disengaged from catch member and a second position wherein the latch member engages the catch member to secure the hoist line in a predetermined position. The predetermined position is substantially fully raised, in order to provide maximum clearance under the grappler when the crane is parked.

In an embodiment, the latch member is a generally J-shaped hook having a contact surface for receiving the catch member and a pivot mounted to the frame. For example, in an embodiment, the contact surface is concave. This shape advantageously keeps the catch member gripped by the hook, causing an appropriate moment arm on the hook to maintain a secure engagement.

In an embodiment, the hoist locking device further includes a latching actuator for selectively driving the hook between the disengaged position and the engaged position. This latching actuator may, for example, be a hydraulic cylinder having one end mounted to the frame, and an opposite end mounted to the hook at a distance from the pivot. The latching actuator may be some other type of fluid driven or electromechanical actuator also. In an embodiment, the latching actuator is mounted to the hook at a position between the contact surface and the pivot. In another embodiment, the latching actuator is mounted to the hook at a position a distance from the pivot opposite the contact surface.

In an embodiment including a clevis for mounting the hoist lines to an end of the actuator, the catch member projects from the clevis.

An advantage of the present invention is that it provides an improved hoist system for a gantry crane.

Another advantage of the present invention is that it prevents a grappler from drifting while in a stored or parked state.

Additionally, the present invention enhances safety by keeping a safe clearance below the grappler.

Additional features and advantages of the present invention are described in, and will be apparent from, the description of the invention herein, the claims, and the drawings.

BRIEF DESCRIPTION OF THE DRAWINGS

FIG. 3 is a plan view of the hoist lock system.

FIG. 4 is a side elevational view of the hoist lock system according to the first embodiment in a disengaged position.

FIG. 5 is a side elevational view of the hoist lock system according to the first embodiment in an engaged position.

FIG. 6 is a plan view of the hoist lock system.

FIG. 7 is a side elevational view of the hoist lock system according to the second embodiment in a disengaged position.

FIG. 8 is a side elevational view of the hoist lock system according to the second embodiment in an engaged position.

DETAILED DESCRIPTION OF THE DRAWINGS

Figure 1:
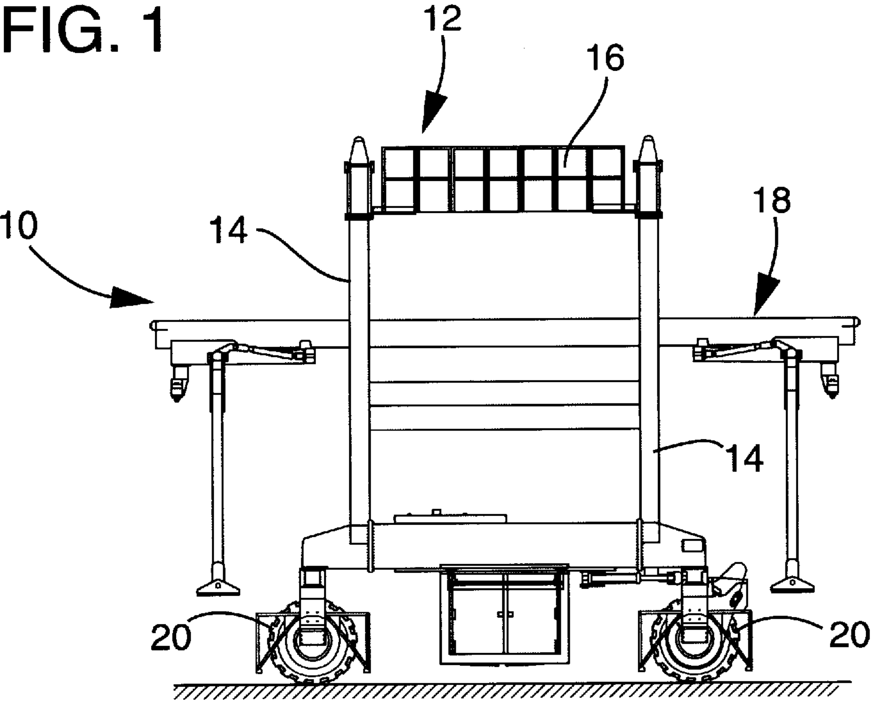
FIG. 1 is a side elevational view of a gantry crane constructed in accordance with teachings of the present invention.
Figure 2:
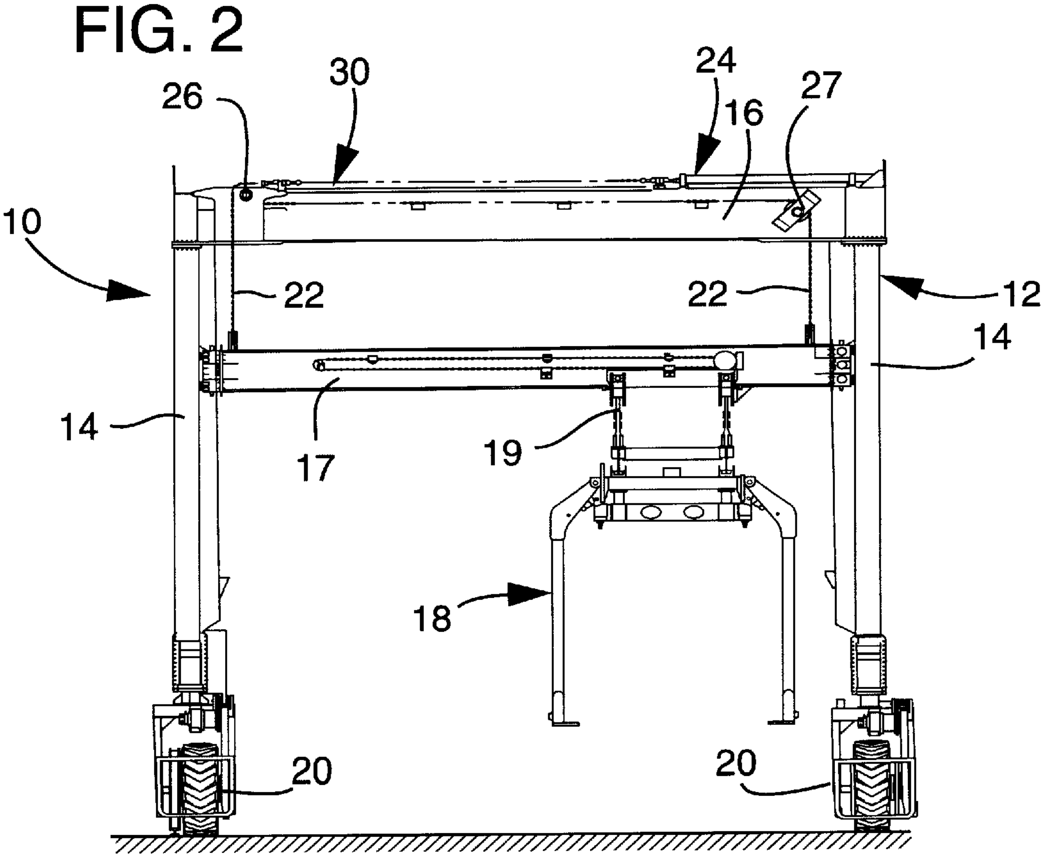
FIG. 2 is a front elevational view of the crane of FIG. 1.

Now referring to the Figures, wherein like numerals designate like components, a gantry crane 10 is illustrated in FIGS. 1 and 2. The crane 10 generally includes a rigid steel frame 12 having a plurality of vertical beams 14 and a plurality of upper horizontal beams 16. Each of the upper horizontal beams 16 is mounted to, and extends between, two of the vertical beams 14. The crane 10 has drive wheels 20 for maneuvering around a shipping yard.

For lifting loads relative to the frame, the crane 10 includes a pair of horizontal stabilizer beams 17 which are movably mounted to the vertical beams 14. More particularly, each of the stabilizer beams 17 extends between two of the vertical beams and is mounted for slidable vertical movement along the vertical beams 14. A grappler 18 adapted for securing loads includes a trolley 19 which is movably mounted to the stabilizer beams 17 so that the grappler 18 can traverse from side to side. The stabilizer beams 17 and grappler 18 are suspendably supported by at least one flexible hoist line 22. Herein, the term hoist line includes a cable, chain, rope, or other flexible linear tension member. As illustrated in the Figures, the hoist line 22 is shown as a chain, although a cable or other tension member could be used instead, and all are within the scope of the invention.

To raise and lower the grappler 18, the hoist line 22 is mounted to a hydraulic actuator 24, so that the actuator is operable to extend or retract the hoist line 22. The hoist line 22 is in tension between the actuator 24 and the stabilizer beams 17 due to the weight of the stabilizer beams 17 and grappler 18. Guided through various pulleys 26, 27 rotatably mounted to the frame 12, moving the hoist line 22 is effective to raise or lower in response to the motion of the actuator 24.

The actuator 24 can be any type of actuator for linearly moving the hoist line. Such actuators can be, for example, fluid driven or electromechanical linear actuator. For example, the actuator 24 could be a ballscrew mechanism driven by an electric, hydraulic, or pneumatic motor, as is generally known. In the illustrated embodiment, the actuator 24 is a hydraulic cylinder with a cylinder portion 30 and an extendible piston 28. The cylinder portion 30 is mounted to one of the horizontal beams 16 of the frame 12. The piston 28 includes a clevis 34 to which the hoist line 22 is mounted.

For facilitating a proper positioning of the crane 10 over a load, as illustrated in FIG. 2, the frame 12 defines a clearance under the elevated horizontal stabilizer beams 17 and between the vertical side beams 14. This enables the crane 10 to be positioned to straddle, for example, a railroad track or road for picking up loads from railcars, trailers, or pallets (not shown).

Figure 3:
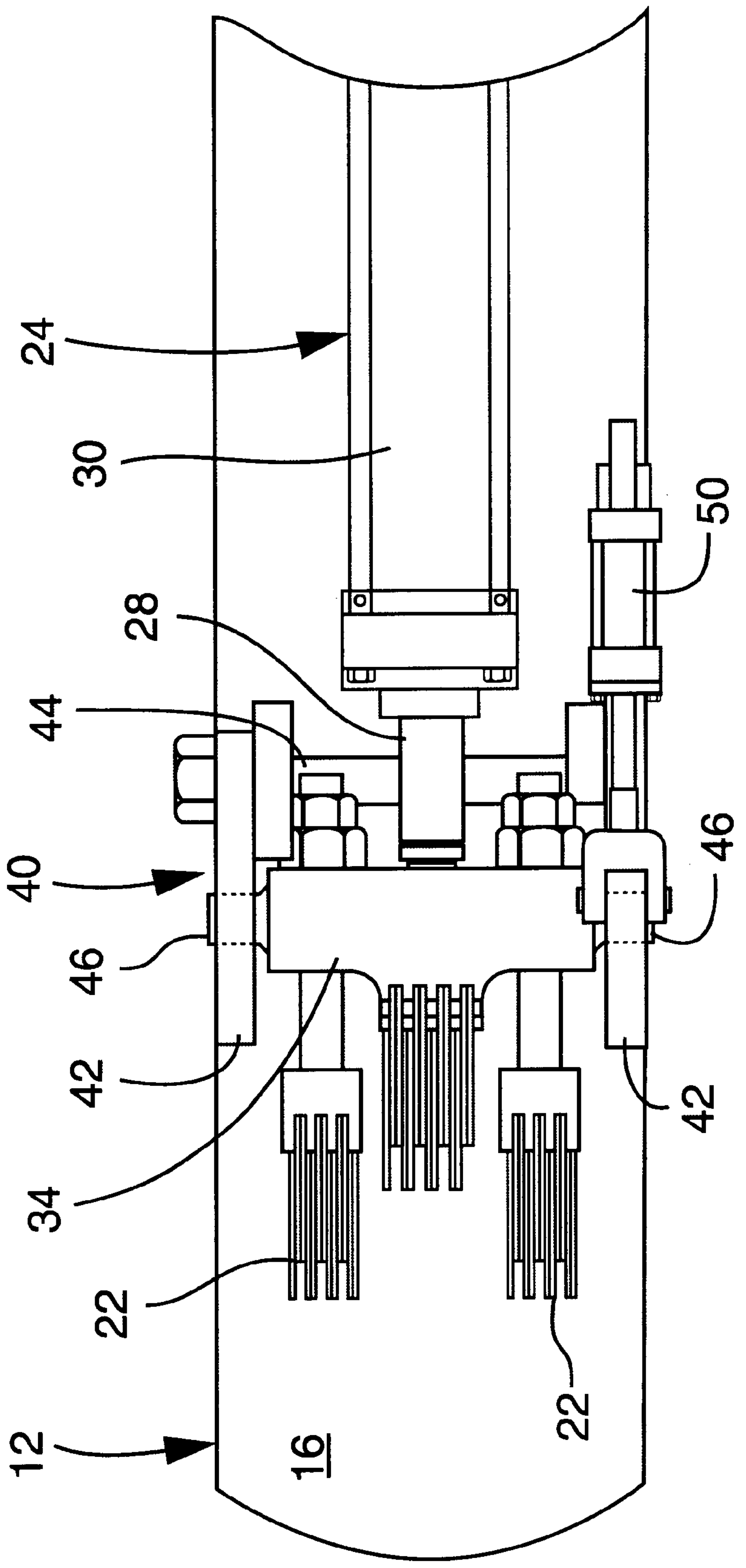
FIGS. 3–5 illustrate a hoist lock system according to a first embodiment of the invention.
Figure 4:
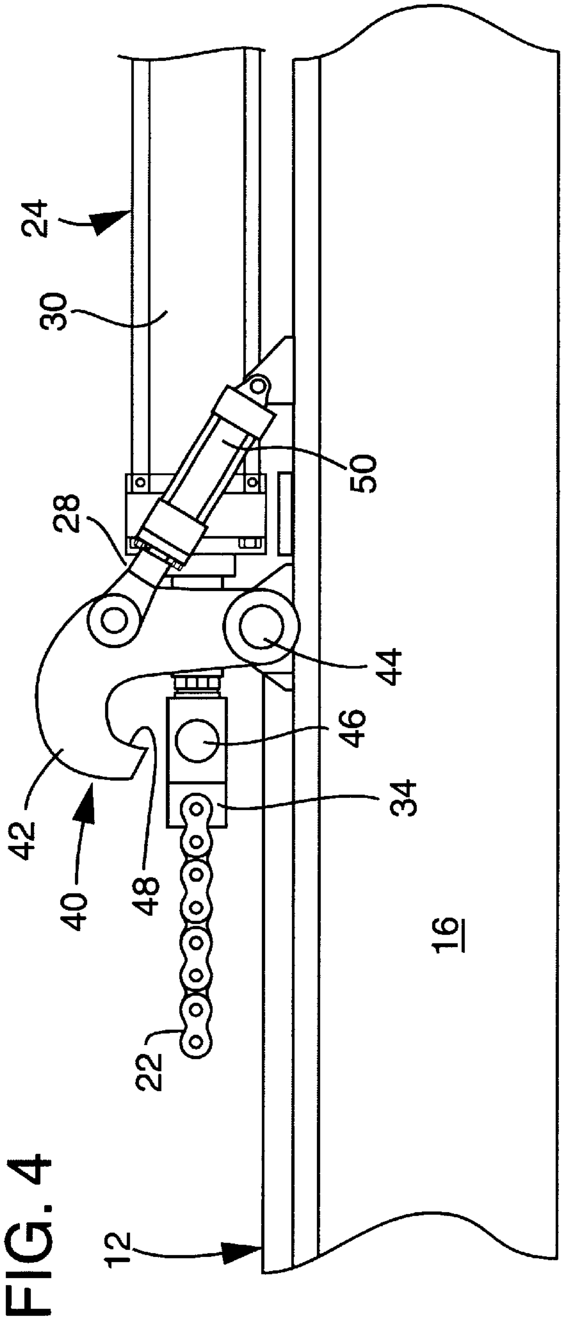
Figure 5:
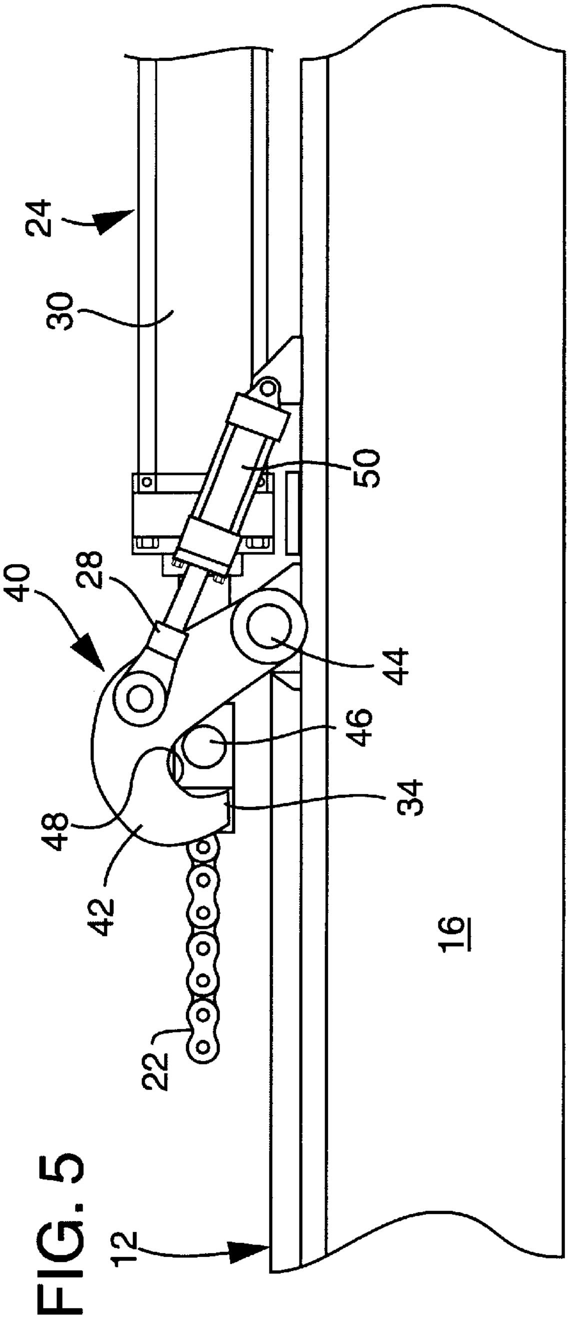
Figure 6:
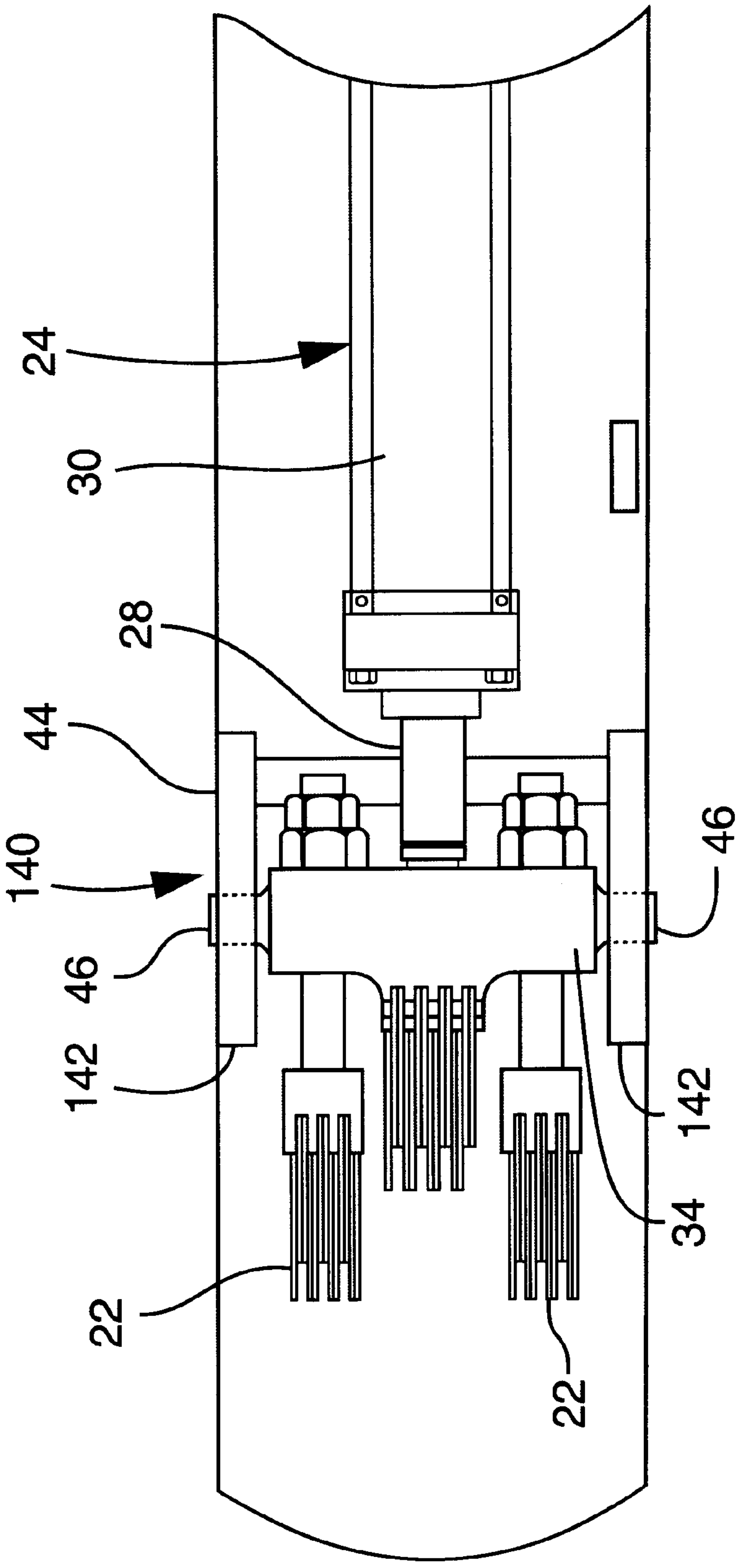
FIGS. 6–8 illustrate a hoist lock system according to a second embodiment of the invention.
Figure 7:
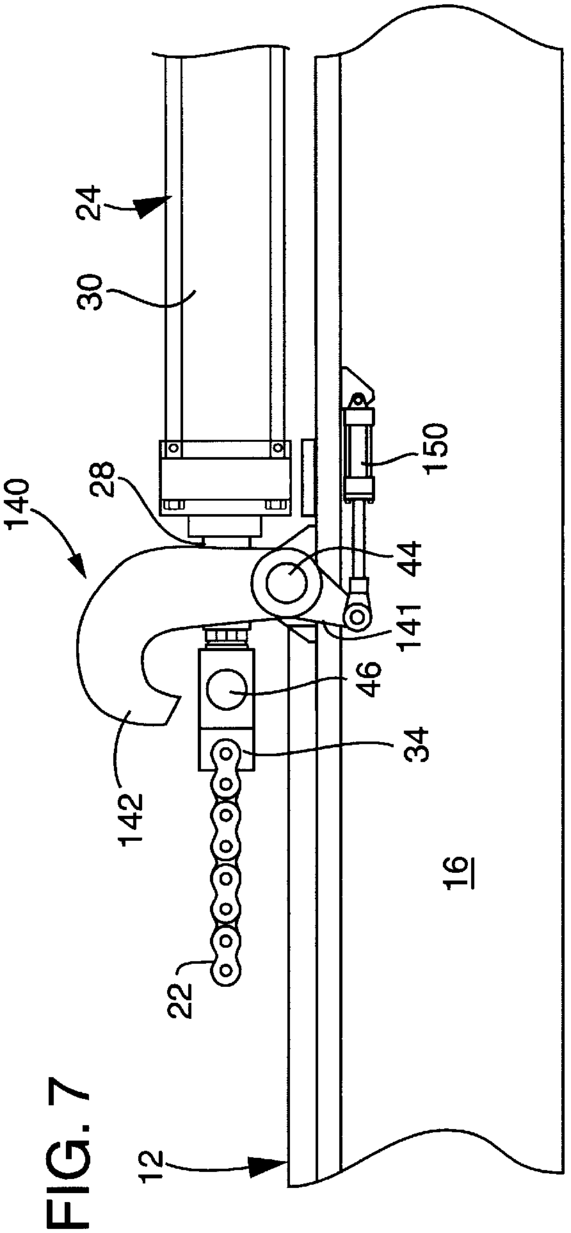
Figure 8:
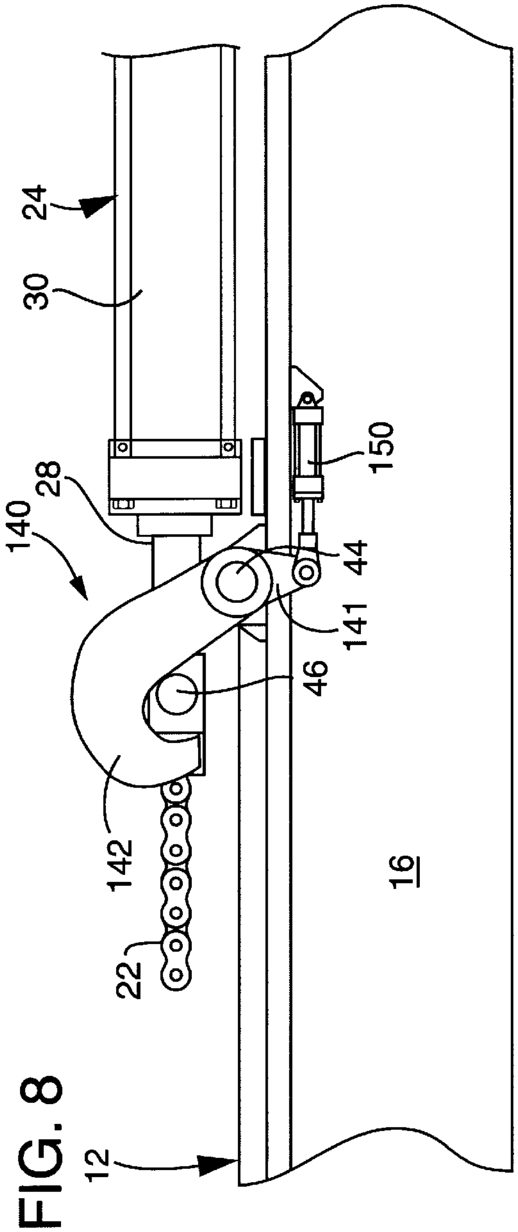

For securing the grappler when the crane 10 is parked, a hoist locking device 40, illustrated in greater detail in FIGS. 3–5. Another embodiment of the hoist locking device 140 is illustrated in FIGS. 6–8. The hoist locking device 40, 140 facilitates the securing of the grappler 18 in an elevated position while the crane 10 is parked. More particularly, the hoist locking mechanism 40, 140 selectively secures the hoist line in a predetermined, substantially-retracted position. This advantageously prevents "drifting" or undesired lowering of the grappler 18, maximizing clearance under the horizontal beams 16.

Referring to FIGS. 3 and 4, the hoist locking device 40 includes a includes at least one latch member 42. As illustrated, the locking device 40 includes two latch members 42, each being a generally J-shaped hook. The latch members 42 are pivotally mounted to the frame 12 on a pivot joint 44.

For engaging the latch members 42, at least one catch member 46 is provided. In the illustrated embodiment, two catch members 46 are illustrated, each being a cylindrical projection that extends laterally from the clevis 34. The two catch members 46, in the illustrated embodiment, extend from opposite sides of the clevis 34, as shown in FIG. 3.

To provide selective locking engagement between the latch members 42 and respective catch members 46, the latch members 42 are movable on the pivot joint 44 between a first position as illustrated in FIGS. 3 and 4 and a second position as illustrated in FIG. 5. In the first position (FIG. 4), the latch member 42 is disengaged from the catch member 46, permitting free movement of the hoist line 22. The latch member 42 is generally kept in the first, disengaged position during operation of the crane 10.

For locking the hoist line 22 in a predetermined position, the latch member 42 is moved to the second position, illustrated in FIG. 5, wherein the latch member 42 engages the catch member 46. When the clevis 34 is at the illustrated predetermined position wherein the catch members 46 are engageable by the latch members 42, as shown, the grappler (FIGS. 1 and 2) is in a substantially raised position. When the latch member 42 is in the second position, the hoist locking device 40 prevents the hoist line 22 from extending to the left with reference to FIG. 5. In effect, this prevents the grappler 18 (FIGS. 1 and 2) from lowering. Advantageously, the hoist locking device 40 thereby holds the hoist line in this position independently of whether the actuator 24 is capable of maintaining such a position under the tension on the hoist line over time.

The hook-shaped latch member 42 in the illustrated embodiment includes a concave contact surface 48 shaped to receive the catch member 46. When the latch member 42 is in the second, engaged position of FIG. 5, the contact surface 48 is shaped to cradle the catch member 46, i.e., portions of the contact surface 48 are preferably oriented non-perpendicularly to the force of contact of the catch member 46 which is along the line of tension in the hoist line 22. This shape creates an appropriate moment arm on the latch member to prevent the catch member 46 from undesirably slipping from the latch member 42. The contact surface 48 could also include planar, angularly oriented surfaces.

To drive the latching members 42 between the first, disengaged position (FIG. 4) and second, engaged position (FIG. 5), the hoist locking device 40 further includes a latching actuator 50. As illustrated in FIGS. 4 and 5, the latching actuator So is a hydraulic cylinder, although some other known rotational or linear actuator could be used. The latching actuator 50 has one end mounted to the frame, and an opposite end mounted to the latching mechanism 42. In the embodiment of FIGS. 3–5, the latching actuator 50 is movably mounted to the latching mechanism 42 at a distance from the pivot 44 toward the contact surface, so that the latch member is in the second engaged position (FIG. 5) when the latching actuator 50 is in an extended position. The pivot joint 44 holds the two latching members 42 relative to each other to pivot in aunison when actuated.

Now referring to FIGS. 6–8, the hoist locking device 140 is shown. The hoist locking device 140 is similar to the device 40 described above in connection with FIGS. 3–5, but the hoist locking device 140 includes a latch member 142 having a drive mount extension 141 that extends away from pivot 44 in a direction opposite contact surface 148. Furthermore, the hoist locking device 140 includes latching actuator 150 having one end mounted to the frame 12 and an opposite end mounted to the drive mount extension 141. The actuator 150 is operable to drive the latch member 42 between the first, disengaged position (FIG. 7) and the second, engaged position (FIG. 8).

Although the invention is described herein in connection with certain preferred embodiments, it is recognized that various changes and modifications to the invention will be apparent to those skilled in the art. Such changes and modifications may be made without departing from the spirit and scope of the invention. Accordingly, the appended claims are intended to cover all such changes and modifications.

What is claimed is:

1. A gantry crane having frame and a hoist system including:

a grappler;

a hoist actuator mounted to the frame;

a clevis operably driven by the actuator for linear movement relative to the frame, the clevis including a catch member;

a flexible hoist line having an end mounted to the clevis, wherein the line extends from the clevis and, in tension, supports the grappler so that movement of said clevis is effective to cause movement of the hoist line which, in turn, is effective to cause vertical movement of said grappler; and a hoist locking device including a latch member mounted to the frame for selective movement to engage the catch member of the clevis to thereby prevent movement of the hoist line and, in turn, to prevent downward movement the grappler which is supported by the tension of the hoist line.

2. The gantry crane according to claim 1, wherein the latch member is pivotable between a first position disengaged from catch member and a second position wherein the latch member engages the catch member to secure the hoist line in a predetermined position.

3. A gantry crane according to claim 1, wherein the latch member is at least one hook having contact surface for receiving the catch member and a pivot mounted to the frame.

4. A gantry crane according to claim 3, wherein the hoist locking device further includes a latching actuator for selectively driving the hook between the disengaged position and the engaged position.

5. A gantry crane according to claim 4, wherein the latching actuator is a hydraulic cylinder having one end mounted to the frame, and an opposite end mounted to the hook at a distance from the pivot.

6. A gantry crane according to claim 5, wherein the latching actuator is mounted to the hook at a position between the contact surface and the pivot.

7. A gantry crane according to claim 5, wherein the latching actuator is mounted to the hook at a position a distance spaced from the pivot opposite the contact surface.

8. A gantry crane according to claim 3, wherein the contact surface is concave.

9. A gantry crane according to claim 1, wherein the grappler is substantially fully raised when the clevis is engaged with the latch member.

10. A gantry crane according to claim 1, wherein the hoist locking device includes two of said hooks and two of said catch members, the two catch members extending from opposite sides of said clevis, the two hooks receiving the clevis therebetween.

11. A gantry crane according to claim 1, wherein the frame includes a plurality of vertical beams and a plurality of horizontal beams mounted to the vertical beams, the crane further comprising a pair of horizontal stabilizer beams, each of the stabilizer beams being movably mounted to the frame and extending between two of said vertical beams, the grappler being mounted to said stabilizer beams, the stabilizer beams being mounted to said hoist lines, so that movement of the hoist lines is operable to raise or lower the stabilizer beams and grappler.

12. A gantry crane according to claim 1, wherein the hoist actuator is a piston-cylinder device, and wherein the clevis is mounted to an end of the piston.

* * * * *